2,730,322

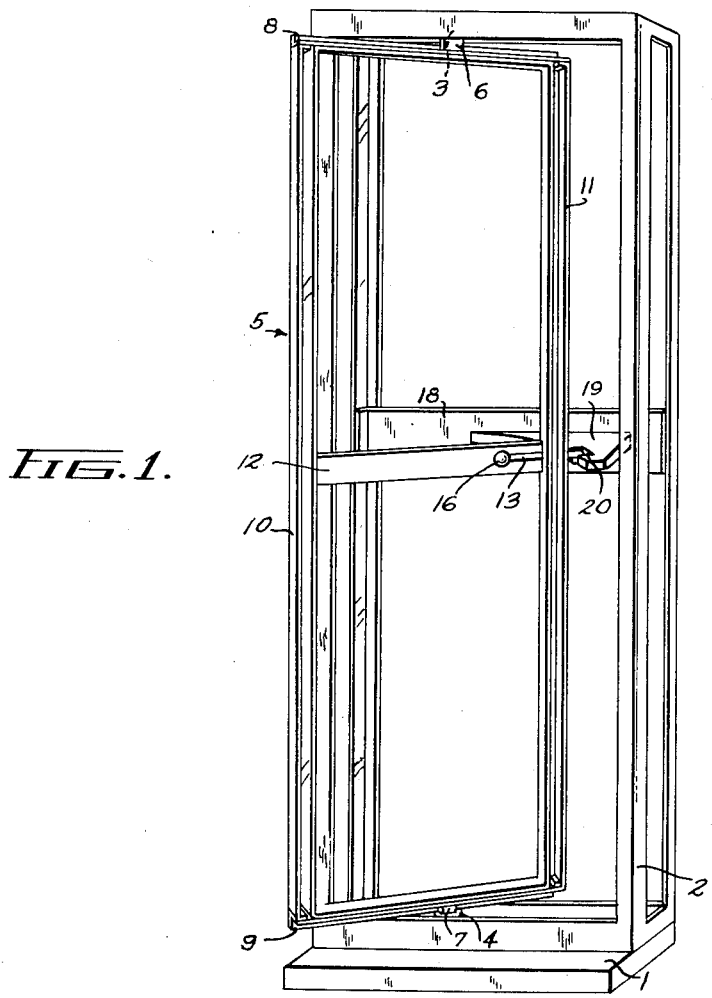
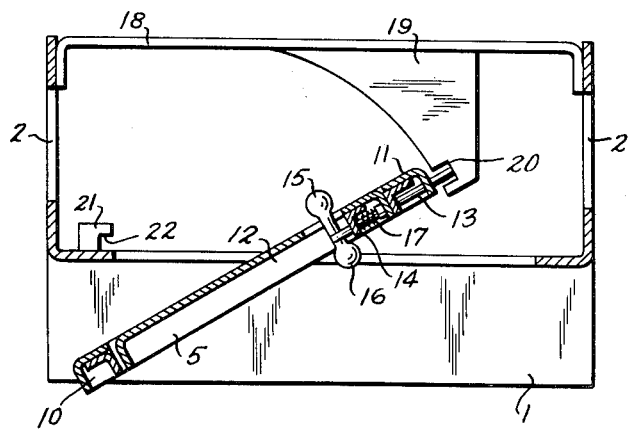

MOUNTING RACKS FOR ELECTROACOUSTIC APPARATUS

Fritz Haberland, Emmendingen, Baden, and Walter Johner, Riegel Kaiserstuhl, Germany, assignors to Klangfilm Gesellschaft mit beschränkter Haftung, Berlin, Germany, a corporation of Germany Application July 5, 1951, Serial No. 235,344
In Germany October 27, 1949

Public Law 619, August 23, 1954
Patent expires October 27, 1969

3 Claims. (Cl. 248—127)

Our invention relates to mounting racks or frame structures for electroacoustic apparatus such as amplifiers.

Such mounting structures have been equipped with a hinged-door-like portion for holding the apparatus to be mounted. This design requires a very sturdy construction of the hinged portion and of the pertaining journal means to prevent the portion from sagging and distortion under the weight of the apparatus mounted thereon, and there is also the danger of the rack structure toppling over when the door portion is open.

It is an object of our invention to obviate these shortcomings and to make the mounted apparatus more readily accessible in cases where two or more mounting racks are placed side by side.

To this end, and in accordance with the invention, we offset the hinge axis of the rotatable mounting panel or frame portion from the parallel long edges of the rack structure a distance up to the middle of the rack side at which the rotatable portion is located, preferably so that the portion is rotatable over an angle of at least about 170°. The hinge pivots may consist, for instance, of insertable pins properly secured in position preferably by screws.

With such a rack structure, any assembling, checking or repair jobs at the rear of the pivoted portion can be carried out after turning it a sufficiently wide angle to make the affected parts readily accessible from the front of the rack structure. Besides, the rotatable portion and its hinges can be given a much lighter design than in the known rack structures of this kind. This is so because offset location of the hinge axis permits giving the individual apparatus on the rotatable portion a sufficiently balanced arrangement to minimize the forces acting upon the hinge pivots. A rack structure according to the invention also minimizes the space needed for installation and maintenance, this being especially advantageous where space is at a premium, for instance, in the operator's room of movie theaters. A further advantage is the fact that, when two or more such rack structures are placed closely side by side, each of them is readily and fully accessible for work without obstructing the access to the other.

According to another feature of the invention the rotatable portion of the rack structure is designed as a frame suitable for the mounting of individual apparatus or parts in form of inserts. This frame is preferably equipped with a cable duct to receive the electric conductors leading to and from the mounted apparatus.

According to still another feature of the invention the rack structure and its rotatable portion are equipped with arresting means for holding the rotatable portion in its fully open position. To this end, a spring-biased latch may be provided which engages a catch when the rotatable portion reaches its fully open position. This has the advantage that during mounting or repair work the pivoted frame portion is immovably latched in position, thus facilitating an unimpeded assembling, inspecting or repair work. Preferably the just-mentioned arresting means also serve to latch the rotatable portion in its closed position. While the latch may be so designed that it catches only when the rotatable part reaches the fully closed position, a further advantage is obtained by having the arresting means abut against a stop shortly before the rotatable portion reaches the closed position so that a release must be actuated before a complete closing is possible. When the rotary portion, for instance, after the completion of repair work, is turned toward the normal, closed position, it cannot immediately be swung into that position but first stops at a place where a sufficient gap remains to prevent injury to the hand of the attendant.

The foregoing objects, advantages and features of the invention are apparent from the embodiment described in the following with reference to the drawing in which Fig. 1 is a perspective view of a rack structure according to the invention with the pertaining pivoted panel portion in open position, and Fig. 2 is a horizontal cross section through the same structure.

According to Fig. 1, a base plate 1 carries a rigid rack structure 2 of rectangular shape and cabinet skeleton design. The upper and lower cross rails at the frontal broadside of the rack structure are equipped with pivot bearings 3 and 4 for a rotatable door-like portion 5 which is designed as a metal frame and hinged by means of pivot pins 6, 7 in the respective pivot bearings 3 and 4. When mounting the rotatable panel portion 5 on the frame structure of the rack, the bores of portion 5 for the pivot pins 6 and 7 are first placed in registry with the bores of the pivot bearings 3 and 4. Thereafter the pivot pins are inserted and secured in position. The pivot pins may be fastened to the rack structure or to the panel portion 5 by means of screws which are inserted parallel to the axis of the pivot pins so that each screw thread engages partially the material of the pivot and partially the material around the pivot.

As apparent from the drawing, the pivot axis is offset from the parallel long edges of the rotatable portion 5 and hence also from the parallel long edges of the rack structure. The spacing of the pivot axis from the closest long edge may be as large as up to the middle of the rack broadside although an out-of-center spacing not less than about one quarter of the total width is preferable. Such a spacing is large enough to permit turning the pivoted front portion 5 an angle of at least about 170°. Consequently, when the panel portion is in the open position, its rear side is located at the front of the rack structure so that the mounted apparatus are readily accessible from the back, where the terminals, fastening means and cable connections are located, thus greatly facilitating any inspection or repair work. In the illustration, the frame 5 is shown turned to a position about 150° away from the normal, closed position. Hence, in Fig. 1 the frame 5 is seen from its rear side.

The frame 5 is composed of two angle rails 8, 9 at the narrow frame sides and two pairs 10 and 11 of angle rails forming the long sides of the frame. Each of pairs 10 and 11 of longitudinal rails is composed of two angle members which are joined with each other by screws or welding so as to form two vertical cable channels open toward the rear of the panel frame. The longitudinal and cross members of the frame 5 are firmly connected with one another at the four corners of the frame, and the stability of the frame is increased by a cross brace 12 of rectangular cross section.

The cabinet structure shown in Fig. 2 is in accordance with the foregoing description except that it shows also a device for arresting the rotary panel frame. According to Fig. 2, the cross brace 12, located at about the middle height of the rack, carries a latch 13 slidably guided by an angle piece 14 and by bores in the two longitudinal angle rails 11. The latch 13 has two handles 15 and 16 permitting it to be operated from the front as well as from the rear of the pivoted frame portion 5. A helical compression spring 17 acting against a flange on latch 13 biases it outwardly, i. e. toward the right of portion 5 viewed from the front. Mounted on the rear side of the rigid rack structure 2 is a cross bar 18 with a curved guide piece 19 which has a recess 20 engageable by the latch 13. When the panel portion 5 is being opened, the front end of latch 13 slides along the curved guide piece 19 which forces it progressively toward the interior of the panel portion 5 in opposition to the latch spring 17 until, when the panel frame reaches the completely open position, the latch catches into the recess 20 thus arresting the panel frame. For closing the panel portion 5, the latch 13 is withdrawn by pulling the handle 16. The handle may thereafter be released as soon as the latch 13 comes clear of the recess 20. The closing movement of the panel frame is limited by a stop 21 mounted on the front portion of the stationary rack structure thus leaving a gap open to prevent injury to the attendant or damage to any cables or leads not yet properly placed into the interior of the rack. For fully closing the panel portion 5, the latch 13 is withdrawn by now actuating the handle 15, thus permitting the panel portion to turn fully into the normal position where latch 13 catches into a recess 22 of stop member 21 to arrest the panel portion in the proper operating position.

We claim:

1. A mounting rack for operatively-wired electric apparatus, comprising a rack structure having rectangular sides whose long edges are vertical, a rotatable mounting frame for accommodating the apparatus to be wired, said frame being hinged to said structure at one of said sides between two long edges in the manner of a door and having a vertical hinge axis parallel to the two long edges of said one side and spaced from one of said edges a distance of more than one quarter but less than one half of the horizontal width of said frame, arresting means comprising a latch member slidably mounted in said frame for movement in a radial direction with respect to said vertical hinge axis, resilient means normally biasing said latch member in a direction outward of said axis, a first catch member secured to said structure, said latch member being engageable with said first catch member when said frame is rotated to be in an open position, a second catch member secured to said structure, said latch member, when in normal position, being abuttable against said second catch member when said frame is rotated to be in nearly closed position, and manually operable means for withdrawing said latch member against the biasing action of said resilient means, said second catch member comprising means cooperative with said latch member to lock said frame in closed position in said rack structure.

2. A mounting rack for operatively-wired electric apparatus, comprising a rack structure of cabinet skeleton design having rectangular sides and having its long edges extend vertically, a door-like mounting frame for the insertion of the apparatus to be mounted and wired, said frame being pivoted on said structure at one of said sides between two long edges and having a closed position substantially flush with said one side, said frame having a vertical pivot axis parallel to the two long edges of said one side and spaced from one of said edges a distance of more than one quarter but less than one half of the horizontal width of said one side, whereby said frame is pivotally movable to an approximately reversed position in which the rear of said frame lies in front of the other long edge of said one side of said structure, arresting means comprising a latch member slidably mounted in said frame for movement in a radial direction with respect to said vertical pivot axis, resilient means normally biasing said latch member in a direction outward of said axis, a first catch member secured to said structure, said latch member being engageable with said first catch member when said frame is rotated to be in said reversed position, a second catch member secured to said structure, said latch member, when in normal position, being abuttable against said sound catch member when said frame is rotated to be in nearly closed position, and manually operable means for withdrawing said latch member against the biasing action of said resilient means, said second catch member comprising means cooperative with said latch member to lock said frame in closed position in said rack structure.

3. A mounting rack for operatively-wired electric apparatus, comprising a generally cabinet-shaped rack structure having vertical substantially rectangular broadsides of which one is open, a door-like mounting frame for the insertion of the apparatus to be wired, said mounting frame being vertically hinged to said structure on said open broadside and having a closed position flush with said latter broadside, said frame having a vertical hinge axis horizontally spaced from one of the vertical edges of said open broadside a distance of more than one quarter but less than one half of the horizontal width of said open broadside so that said frame can be turned from said closed position to a substantially reversed position about an angle of less than 180°, said frame having a channel structure extending along a vertical edge of said frame and forming a cable channel, said channel structure being open toward the interior of said cabinet structure when said mounting frame is in said closed position, arresting means comprising a latch member slidably mounted in said frame for movement in a radial direction with respect to said vertical hinge axis, resilient means normally biasing said latch member in a direction outward of said axis, a first catch member secured to said structure, said latch member being engageable with said first catch member when said frame is rotated to be in said reversed position, a second catch member secured to said structure, said latch member, when in normal position, being abuttable against said second catch member when said frame is rotated to be in nearly closed position, and manually operable means for withdrawing said latch member against the biasing action of said resilient means, said second catch member comprising means cooperative with said latch member to lock said frame in closed position in said rack structure.

References Cited in the file of this patent

UNITED STATES PATENTS

| 143,153 | Hayes | Sept. 23, 1873 |
| 145,805 | Knevals | Dec. 23, 1873 |
| 459,834 | Deissler | Sept. 22, 1891 |
| 765,494 | Krom | July 19, 1904 |
| 942,965 | Kramer | Dec. 14, 1909 |
| 946,337 | Clear | Jan. 11, 1910 |
| 2,572,618 | Haury et al. | Oct. 23, 1951 |

FOREIGN PATENTS

| 342,429 | Germany | June 27, 1919 |